United States Patent [19]
Elkins et al.

[11] 3,812,587
[45] May 28, 1974

[54] INDEXING MEANS FOR WALL PANEL OPENINGS

[75] Inventors: Johnny C. Elkins; Gilbert A. Theriot, Box 4030, both of San Angelo, Tex.

[73] Assignee: said Theriot, by said Elkins

[22] Filed: June 22, 1972

[21] Appl. No.: 265,289

Related U.S. Application Data

[63] Continuation-in-part of Ser. No. 100,080, Dec. 21, 1970, Pat. No. 3,672,064.

[52] U.S. Cl. ............. 33/138, 33/180 R, 33/DIG. 10
[51] Int. Cl. ............................................. G01b 3/02
[58] Field of Search ...... 33/137, 138, 189, DIG. 10, 33/197

[56] References Cited
UNITED STATES PATENTS

| | | | |
|---|---|---|---|
| 1,467,840 | 9/1923 | Crogan | 33/138 |
| 2,647,325 | 8/1953 | Little | 33/137 R X |
| 3,113,382 | 12/1963 | Lursen | 33/138 X |
| 3,459,429 | 8/1969 | Green | 33/137 R |
| 3,514,863 | 6/1970 | Moll | 33/138 |

*Primary Examiner*—William D. Martin, Jr.
*Attorney, Agent, or Firm*—Marcus L. Bates

[57] ABSTRACT

Indexing apparatus for accurately marking and positioning indicia to enable cutouts to be formed in a panel in order to accommodate fixtures and other objects associated with a building structure which must be received within the cutouts when the panel is attached to the structure.

A molded unitary assembly having means thereon for accommodating spaced apart normally disposed tape measuring apparatus so that the extensible tapes of the tape assemblies can be retracted into and extended from the tape cases. Means are included in the assembly which cooperates with the tape apparatus for locking the tape blade into any desired position. The tape assembly can be removed from the main housing for replacement or auxiliary use.

10 Claims, 7 Drawing Figures

PATENTED MAY 28 1974 3,812,587

INDEXING MEANS FOR WALL PANEL OPENINGS

CROSS-REFERENCE TO RELATED APPLICATIONS

Our copending patent application Ser. No. 100,080, filed Dec. 21, 1970, now U.S. Pat. No. 3,672,064, issued June 27, 1972, of which the instant application is a "Continuation-In-Part".

BACKGROUND OF THE INVENTION

Reference is made to my copending patent application Ser. No. 100,080 filed Dec. 21, 1970, now U.S. Pat. No. 3,672,064 issued June 27, 1972, for further background of the invention.

It is desirable to provide an indexing apparatus in the form of a compact and durable unitary assembly which can be made of inexpensive polyethylene or the like, and which can accommodate a pair of laterally disposed tape assemblies with the tape blades thereof extending normally relative to one another to thereby provide an indexing means for use in forming wall panel openings.

SUMMARY OF THE INVENTION

This invention relates to improved apparatus for indexing cutouts to be formed in a panel with respect to objects or fixtures which are to be received by the cutouts when the panel is affixed to a structure.

One form of the invention sets forth apparatus having a base from which there depends a first and second tape shelter arranged 90° with respect to each other. Each tape shelter accommodates a measuring means in the form of a measuring tape rolled upon itself and enclosed within a tape case. The apparatus includes structure which forms an alignment means with respect to the object which is to be received by the cutout to be formed in a panel. Portions of the apparatus form means by which the tape and case assembly can be removably affixed thereto, and additionally provides a brake or lock means to selectively secure the tape blade at any predetermined position.

A primary object of this invention is the provision of apparatus for accurately indexing the location of cutouts on paneling that is to be attached to structure.

Another object of this invention is the provision of apparatus for laying out cutouts on paneling to enable the cutouts to be indexed with respect to objects protruding from structures when the paneling is affixed thereto.

Another object of the present invention is the provision of indexing means for ascertaining the relative location of an object associated with structure with respect to another part of the structure and for transferring this relative location onto a piece of paneling so as to enable a cutout to be effected in the paneling for the purpose of receiving the object therethrough, or alternatively for aligning the object therewith, when the paneling is attached to the structure.

A further object of this invention is to disclose and provide indexing apparatus in the form of a combination of a main support structure and two extendible tape measuring devices.

A still further object of this invention is to provide indexing apparatus having a tape associated therewith, with the means by which the tape assembly is attached to the housing additionally forming a lock means.

The above objects are attained in accordance with the present invention by the provision of a combination of elements fabricated in a manner substantially as described in the above abstract and summary for indexing the location for forming openings in wall paneling.

These and various other objects and advantages of the invention will become readily apparent to those skilled in the art upon reading the following detailed description and by referring to the accompanying drawings.

DETAILED DESCRIPTION OF THE DRAWINGS

Figure 1:
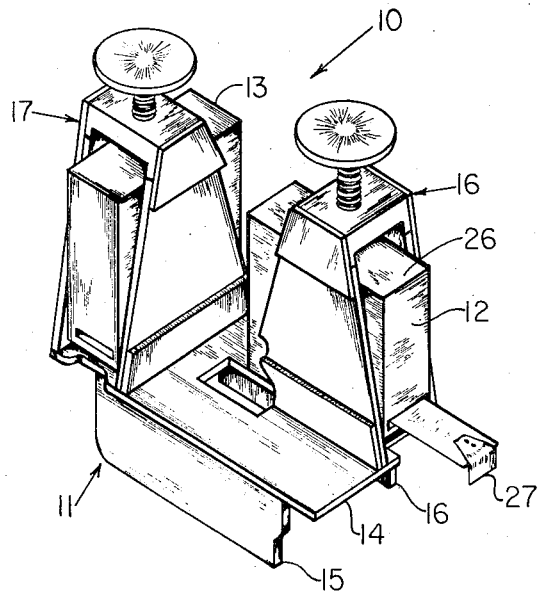
FIG. 1 is a perspective view of the preferred embodiment of the invention.

FIG. 1 discloses an indexing apparatus generally indicated by the numeral 10. The apparatus includes a main support structure 11, which can be fabricated from polyethylene or aluminum, or other plastic or metallic compositions amenable to injection molding, or the like.

The main support structure releasably captures spaced apart tape measuring apparatus 12 and 13 therein, with the tape measuring apparatus being normally disposed relative to one another. Broadly, the support structure is comprised of a base and horizontal guide from which there downwardly depends spaced apart vertical guide means 15 and 16. Upwardly depending from the base are two spaced apart tape case holding means or shelters 16 and 17 which capture the before mentioned tape measuring apparatus therewithin. The shelters are arranged so that the tapes are located normal relative to one another with the blades extending in a direction 90° apart but laying in a common plane.

Figure 3:
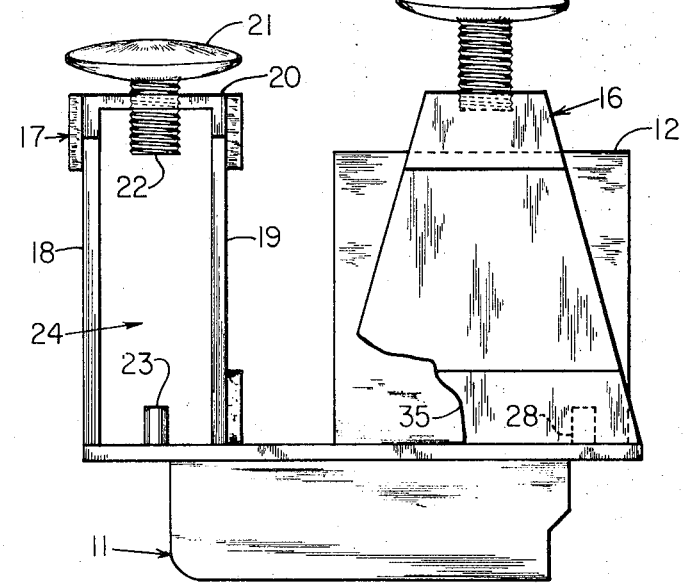
FIG. 3 is an enlarged end view of the apparatus disclosed in the foregoing figures.

As best illustrated in FIG. 3, each shelter is formed by spaced apart parallel vertical bulkheads 18 and 19. Each bulkhead is defined by edge portions which lay at an acute angle relative to the other so that they terminate or become joined to ceiling member 20.

Knob and screw member 21 form a lock means and threadedly engage the ceiling member. The threaded screw portion of the lock means has a lower terminal free end portion 22 which extends downward into the void 24 formed by the shelter bulkheads. Peg 23 upwardly depends a limited distance through the base and into the void 24. The screw member and peg are diametrically opposed to one another and cooperate together to form the brake or lock means which secures the measuring blade in any desired position.

Figure 4:
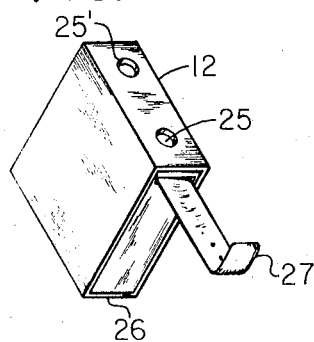
FIG. 4 is a perspective view of a part of the apparatus disclosed in the foregoing figures.

As seen in FIG. 4, the tape measuring apparatus preferably is a commercially available tape measuring means which has been modified in accordance with the present invention by having apertures 25, 25' formed in the base thereof. A common flexible metal tape measuring blade 27 is enclosed within the usual case 26.

Figure 2:
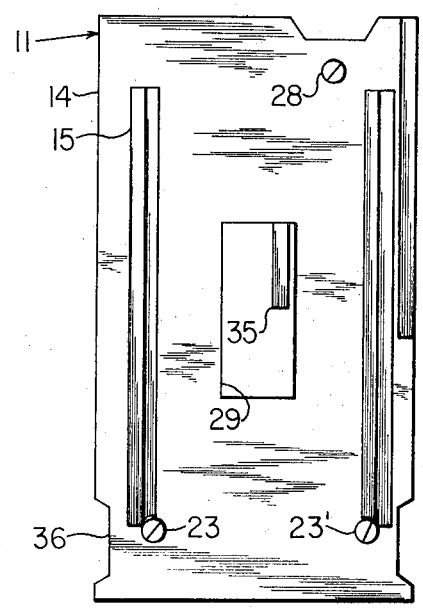
FIG. 2 is an enlarged bottom view of the apparatus disclosed in FIG. 1.

Looking again now to FIGS. 1–3, and in particular to FIG. 2, peg 28 upwardly extends through the base and into the shelter void in a manner similar to peg 23, so that the free depending end of the peg is telescopingly received in a slidable manner within one of the apertures provided in the base of the case of the tape measuring apparatus. It should be understood that peg 28 cooperates with one of the apertures formed within tape 12, while peg 23 cooperates with either of the apertures formed within tape 13.

Rectangular cutout 29 forms a guide and alignment sight means, as well as providing an aperture within the base for receiving the toggle of an electrical switch therewithin as will be pointed out in greater detail later on.

Figure 5:
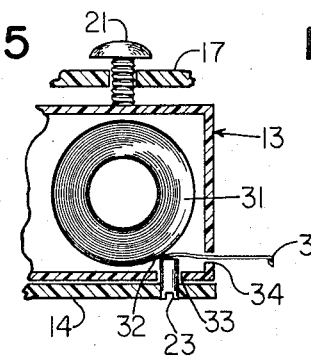
FIG. 5 is an enlarged, fragmentary, part cross-sectional view which sets for the details of a portion of the apparatus disclosed in FIGS. 1–3.

As seen in FIG. 5, blade 30 of either tape is rolled upon itself in the usual manner so that it can be compactly stored in the rolled-up manner illustrated at 31. A marginal longitudinal length of the tape blade passes over the free end of the peg at 32. The terminal end of the peg extends through aperture 33 and into engagement with the rolled up portion of the tape blade so that the marginal portion of the blade is sandwiched between the peg and the rolled up portion of the blade. Slot 34 forms a passageway through which the tape blade can be extended in a direction away from the case.

As best illustrated in FIGS. 1 and 3, cutout 35 is of a size and configuration to provide clearance for receiving the toggle of an electrical switch should the toggle be extended through aperture 29. Diametrically opposed cutouts 36 provide easy access to enable one's fingers to grasp tape end 30, regardless of the choice of the two locations of the tape case relative to shelter 17. A similar single cutout is located in the base adjacent to peg 28 for the same purpose as the before mentioned cutout 36.

The tape measuring apparatus 12 and 13 can be a modified selection of any number of commercially available tape measuring apparatus, but preferably is a type having a plastic case so that the uppermost horizontal wall member 26 can be deformed easily when engaged by terminal end 22 of the locking means. Apertures 25, 25' and 33 are readily formed within the case by any convenient means such as a drill bit having a depth guard thereon.

The main support member preferably is made by injection molding so that a unitary apparatus having great strength and structural integrity is made available by taking advantage of design parameters such as ribs, webs, and the like.

The tape measuring apparatus is placed into operative position within its corresponding shelter by moving end 22 of the locking screw into close proximity of the ceiling by partially unscrewing the knob of the lock means. Wall portion 26 of the case is placed adjacent to the ceiling member and the tape measuring apparatus telescopingly slid into the shelter until peg 23 is aligned with aperture 25; whereupon the tape measuring apparatus is then pushed into the position illustrated in FIGS. 1, 3, and 5, with the peg being received within its associate aperture. Lock 21 is then rotated or screwed until end portion 22 is positioned so that it downwardly biases the case thereby developing or increasing the friction at 32. Further rotation of the lock means will lock the blade into any extended position. A slight reverse turn on the lock means sufficiently reduces the friction at 32 so that the blade can be repositioned by being extended or retracted into the case.

It will be noted that dual spaced apart pegs 23, 23' are provided to cooperate with apertures 25, 25' of the case so that the tape measuring apparatus 13 can be placed facing either direction, with the blade thereof laying normal to blade 27 of tape measuring apparatus 12. This expedient enables blade 30 to be extended in either one of two directions laying perpendicular to blade 27. There is no apparent need to provide but one peg at either 23 or 28 for the tape measuring apparatus; this is especially so for the apertured case 12. However, since case 13 is reversible, it is essential to provide a pair of apertures 25, 25'.

In operation, assuming that one desires to place a sheet of paneling upon a wall surface or a supporting structure, with the wall surface being defined by spaced apart studs or the like, and with there being an electrical conduit box permanently secured to the wall surface; the new sheet of paneling is provided with indicia related to the required cutout with the indicia being indexed with the electrical box in the following manner: First, the spaced apart vertical guide means are placed within the electrical switch box. Should an electrical switch be located within the box, the toggle thereof will protrude through aperture 29, otherwise vertical guide means 11 will offer sufficient alignment.

It will be noted that each vertical guide means 15, 16 is provided with a right angle corner at 115 and a curved corner at 111. This aspect of the invention enables corner 115 to be placed within the switch box, whereupon corner 111 is then pushed into the interior of the box, thereby releasably locking the indexing means to the box so that both hands of a workman are free to manipulate the tape blades and lock means. The index apparatus is readily removed from the electrical box by reversing the above procedure.

Figure 6:
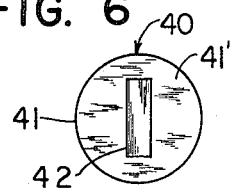
FIGS. 6 and 7 are side and end views of a guide means for use with the indexing apparatus.
Figure 7:
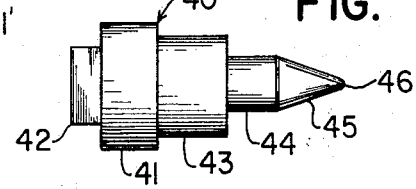

Tape case 13 is removably received within shelter 17 and is reversible so that the blade thereof can be extended in either of two direction. Tape case 12 is removably received within shelter 16 and the blade thereof extends in a direction 90° relative to the position of shelter 17. The blade of each tape measuring apparatus is next extended into alignment with the location on the wall where adjacent edge portions of the new sheet of paneling will be secured. Both lock means are then set to lock the tape blades in the extended configuration. The indexing apparatus is next moved onto the finished face of a sheet of paneling, with the terminal end of each blade engaged with corresponding edge portions of the panel. A pencil mark is made about the outer periphery of the base thereby giving a positive indication of the exact location where the cutout is to be formed in the paneling. In other words, the panel opening has been indexed with the object on the wall which is to be received through the opening in the panel. After aperturing the paneling along the indicated pencil marks, the panel is set into proper position over the electrical box in the exact anticipated relationship with respect to the wall being covered.

Where an object such as a conduit is to be received through the panel, apparatus 40, of FIGS. 6 and 7, which forms an insert guide for centering pipe, is used to advantage by inserting rectangular key 42 into aperture 29 with face 41' being received in abutting relationship against the base and between the vertical guide means. Enlargements 41, 43, 44, respectively are telescopingly received within a large, medium, or small conduit, respectively, thereby freeing both hands of a workman as in the before described manner. The center of a general area can be located by point 46, where deemed desirable.

Cutouts to receive other size or shape objects can be easily indexed by utilizing other portions of the main support member, as for example, "sighting" through aperture 29, setting the tape blades, and then transferring this indexed location onto the paneling.

The present indexing apparatus is rugged in construction, low in cost, attractive and compact in appearance, and can be fabricated of any number of colors or materials. While one specific embodiment of the invention has been illustrated in the drawings, it will be appreciated that the invention broadly encompasses an apparatus for indexing cutouts to be formed in a panel wih objects which are to be received within the cutouts when the panel is affixed to structure having the object thereon.

I claim:

1. Index apparatus for indexing an area which defines a cutout to be formed in a panel with an object located adjacent to a panel supporting structure so that after the cutout has been formed in the panel, the object can be received through the cutout when the panel is affixed to the structure, comprising, in combination:

a main support structure and a pair of tape measuring apparatus;

said pair of tape measuring apparatus each having a case, a blade, with the blade adapted to be received rolled up upon itself within the case;

said main support structure having a base, a tape holding means for removably affixing said tape measuring apparatus to said base, said tape holding means being affixed to said base, said tape measuring apparatus having the blade thereof extensible therefrom with the blade of one of the tapes extending in a direction perpendicular to the blade of another of the tape measuring apparatus;

said tape holding means being in the form of a shelter having a ceiling, adjustment means supported by said shelter for engaging and biasing said case towards said base;

means formed in said case and said main support structure for preventing movement of said blade when said adjustment means biases said case towards said base.

2. The indexing apparatus of claim 1, and further including means by which one of said tape measuring apparatus can be relocated within said tape holding means so as to selectively enable the blade thereof to be extended at 90° or 270° relative to the blade of another of said tape holding means.

3. An index apparatus for indexing cutouts to be formed in a panel with objects which are to be received within the formed cutouts when the panel is affixed to structure having the object located thereon;

said index apparatus comprising a main support structure having a base; shelter means affixed to and depending from said base, means by which each shelter removably receives a rolled tape measuring apparatus therein;

said shelters being arranged normal to one another so that the tape measuring apparatus can have the tape blades thereof extending in a direction perpendicular relative to each other, and;

means formed on said shelter for engaging and biasing said tape measuring apparatus towards said base;

means formed on said main support structure for engaging and holding the blade of the tape when said means formed on said shelter for engaging and biasing said tape measuring apparatus moves said tape measuring apparatus towards said base;

alignment means formed on said support structure for enabling indicia related to the cutout to be formed on a panel; whereby:

said alignment means can be aligned with the object to be received through the cutout, the tape blades can be extended into contact with stucture which is to receive an edge portion of the panel, to thereby enable indicia related to the cutout to be located on the panel in indexed relationship with respect to the object.

4. The indexing apparatus of claim 3, and further including: means by which one of said tape measuring apparatus can be relocated within said tape holding means so that the place thereof is extended in either one of two diametrically opposed directions.

5. An index apparatus for indexing cutouts to be formed in a panel with objects which are to be received within the formed cutouts when the panel is affixed to structure having the object located thereon; said index apparatus comprising:

a main support structure having a base with shelters affixed to and depending from said base, a rolled tape measure apparatus having a tape blade; means by which each shelter removably receives said tape measuring apparatus therein;

each said shelter having saced side walls affixed to said base, said side walls terminating in a ceiling, means by which a screw threadedly engages said ceiling, a free end portion of said screw terminating within an area defined by said shelter; a pin affixed to and depending from said base;

said measuring means having an aperture formed therein for receiving said pin therethrough, said pin and said aperture being arranged relative to said blade and said screw to enable said pin to bear against said blade when said screw bears against a portion of said tape measuring apparatus;

said shelters being arranged normal to one another so that the tape measuring apparatus can have the tape blades thereof extending in a direction perpendicular relative to each other, alignment means formed on said support structure for enabling indicia related to the cutout to be formed on a panel;

so that said alignment means can be aligned with the object to be received through the cutout, the tape blades can be extended into contact with structure which is to receive an edge portion of the panel, to thereby enable indicia related to the cutout to be located on the panel in indexed relationship with respect to the object.

6. Index apparatus for indexing an area which defines a cutout to be formed in a panel with an object located adjacent to a panel supporting structure so that after the cutout has been formed in the panel, the object can be received through the cutout when the panel is affixed to the structure, comprising, in combination:

a main support structure and a pair of tape measuring apparatus;

said pair of tape measuring apparatus each having a case, a blade, with the blade adapted to be received rolled up upon itself within the case;

said main support structure having a base, a tape holding means for removably affixing said tape measuring apparatus to said base, said tape holding means being affixed to said base and including a shelter, said shelter being provided with spaced side walls affixed to said base, said side walls depending from said base and terminating in a ceiling, adjustment means engaging said ceiling and having a free end portion thereof terminating within the area defined by said shelter; a pin means affixed to and depending from said base;

said tape measuring apparatus having the blade thereof extensible therefrom with the blade of one of the tapes extending in a direction perpendicular to the blade of another of the tape measuring apparatus;

said measuring means having an aperture formed therein for receiving said pin therethrough, said pin and said aperture being arranged relative to said blade and said adjustment means to cause said pin to bear against said blade when a terminal end of said adjustment means bears against a portion of said case.

7. The apparatus of claim 1 wherein said adjustment means is a threaded member which threadedly engages said ceiling so that a free depending end of said threaded member can be brought to bear against said case.

8. The apparatus of claim 1 wherein said means for preventing movement of said blade includes a pin affixed to said support structure and an aperture formed in said case with said pin and aperture being located relative to one another and to said adjustment means whereby said pin is brought to bear against the blade when said adjustment means biases said case towards said base.

9. The apparatus of claim 3 wherein said rolled tape measuring apparatus includes a case with said tape blades being contained therein, said adjustment means is a threaded member which threadedly engages said ceiling so that a free depending end of said threaded member can be brought to bear against said case.

10. The apparatus of claim 3 wherein said rolled tape measuring apparatus includes a case within which said blade may be stored, said means for biasing includes a pin affixed to said support structure and an aperture formed in said case with said pin and aperture being located relative to one another and to said adjustment means whereby said pin is brought to bear against the blade.

* * * * *